Nov. 5, 1968        H. ERDMANN        3,409,286
SELF-LEVELING VEHICLE SUSPENSION SYSTEM
Filed April 8, 1966        3 Sheets-Sheet 1

INVENTOR.
HANS ERDMANN
BY
Ross & Mestern

Nov. 5, 1968  H. ERDMANN  3,409,286
SELF-LEVELING VEHICLE SUSPENSION SYSTEM
Filed April 8, 1966  3 Sheets-Sheet 3

INVENTOR.
HANS ERDMANN
BY
Ross & Mestern

United States Patent Office 3,409,286
Patented Nov. 5, 1968

3,409,286
SELF-LEVELING VEHICLE SUSPENSION SYSTEM
Hans Erdmann, Frankfurt am Main, Germany, assignor to Alfred Teves KG, Frankfurt am Main, Germany, a corporation of Germany
Filed Apr. 8, 1966, Ser. No. 541,230
Claims priority, application Germany, Sept. 18, 1965, T 29,428
9 Claims. (Cl. 267—64)

ABSTRACT OF THE DISCLOSURE

A level-maintaining shock-damping suspension cylinder having a dash-pot piston (8) reciprocable in the cylinder (15) against a coil spring (2) surrounding the cylinder while a lever control rod (13) within the cylinder cooperates with a cylindrical control slide (21) for controlling a pumping action whereby a spring seat (20) of the suspension spring is displaced relatively to an attachment point (46) on the vehicle to restore the level of the vehicle body upon reciprocation of the piston during movement of the vehicle after loading; the control slide (21) regulates fluid flow through valved passages and the rate of response of the damping system to fluctuation in the positions of the vehicle body and wheel assembly.

---

Figure 1:
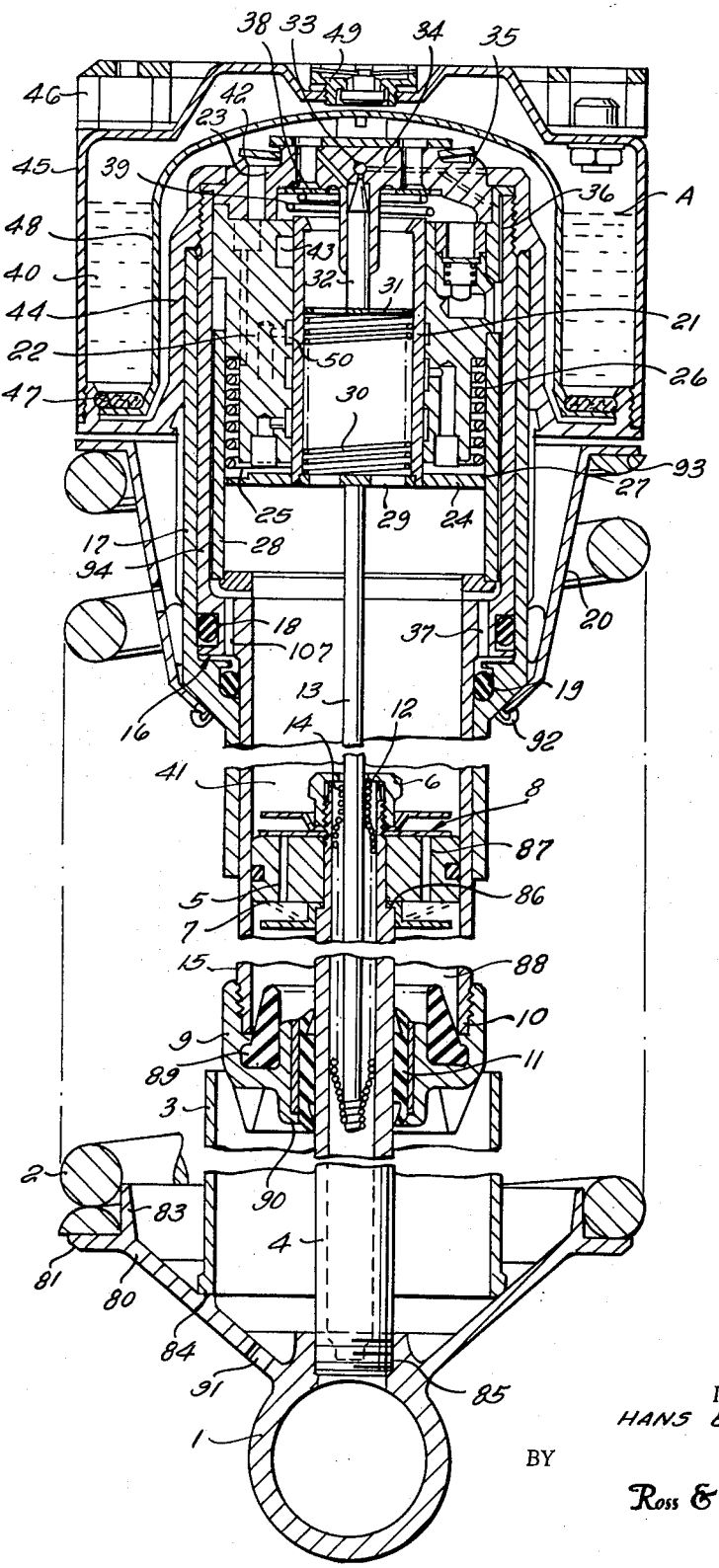

My present invention relates to a vehicle suspension system, especially for automotive vehicles of the type designed to maintain the vehicle body at a substantially constant level with respect to the ground surface in spite of variations of load.

It has been proposed heretofore to provide a device for the resilient suspension of a vehicle, e.g. between a vehicle chassis and axle assembly or between the vehicle body and the chassis, which includes a suspension spring and a shock-absorbing fluid-operated damper; the oscillation damper, which also serves to prevent the transfer of shocks and other impulses to the body, generally includes a pumping arrangement for displacement of a fluid, a fluid-supply receptacle and a level-controlling arrangement for regulating the flow of fluid to or from this receptacle. It will be understood that the word "level" is used herein to designate in general terms the position of the body of a vehicle with respect to the road surface and, therefore, the wheel axles and consequently the relative positions of the ends of the shock absorber itself. In a shock absorber of the leveling type, the hydraulic or pneumatic system of the oscillation damper is actuated upon any loading of the vehicle tending to lower the level to counteract the progressive compression of the springs by increasing the distance between the vehicle body and the spring seat and thus restore the original relative positions of the body and wheel positions.

In conventional level controls for such shock absorbers, a pump, continuously operating during vehicle travel, is connected to the fluid-responsive level-compensating device which has a continuous return stream (to the fluid-storage receptacle). The level control makes use of systems for cutting off the outflow of the pump or connecting the leveling system into the return line. These arrangements have the significant disadvantage that they are activated even during dynamic changes in the loading at the wheels as arises, for example, upon entering an S-curve or driving over a banked road portion or an irregular road surface. Under these circumstances, one of the wheels of the vehicle may carry temporarily an unequal portion of the load so that the load-leveling suspension device at this wheel is brought into play. As this condition abates, however, the adjusted load-leveling device serves to place the vehicle in an unbalanced condition until the shock absorber can be restored to normalcy. To avoid this disadvantage, it has hitherto been the practice to dimension the pump with a comparatively small stroke and to provide a throttle valve in the return line so that the response of the shock absorber is extended or delayed and will thus not materially alter the relative positions of the body and the wheels during travel along irregular road surfaces, curves and banked road portions and is only actuated when the vehicle is loaded or unloaded and/or is forced to travel under conditions wherein the load situation is maintained for prolonged periods. Thus, the device for limiting the effective stroke of the pump and the return flow of fluid makes the shock absorber effective, after loading of the vehicle, only after a relatively long stretch of travel.

It is, therefore, the principal object of the present invention to provide a load-leveling shock absorber which is responsive to changes of the load carried by the vehicle and affects the suspension system in a much shorter stretch of travel then has hitherto been possible and yet is not materially triggered by transient conditions which have hitherto tended toward actuation of the suspension.

A further object of this invention is to provide a level-maintaining suspension system for an automotive vehicle which is responsive to the load carried by the vehicle body and effective over relatively short periods of vehicle operation but which is substantially nonresponsive to the changes of the apparent load applied to the suspension because of variations in road conditions and driving practice.

Still another object of this invention is to provide an improved and highly effective level-maintaining shock absorber of relatively simple construction.

These objects and others which will become apparent hereinafter are attained, in accordance with the present invention, through the provision of a cylinder-type or "direct-action" shock absorber which comprises a controlled or valved oscillation damper or dashpot operatively connected with the level-restoring system and, more specifically, interposed between a control element of this system and a valve operable thereby to preclude its operation during normal vehicle travel (during which the usual hydraulic dashpot takes up the fluctuations corresponding to transient apparent-load changes). Thus, the invention comprises a control valve or slide for the level-maintaining device which is slidable within the shock absorber and is connected with one of the members of the oscillation damping device, as will become more readily apparent hereinafter. The fluid receptacle is preferably disposed above the shock-damping chamber and the level-maintaining device likewise disposed at the upper end of the shock absorber. The main cylinder advantageously widens at its upper end to receive the level-maintaining device while the piston of the apparatus contains or functions as the pumping mechanism.

Figure 2:
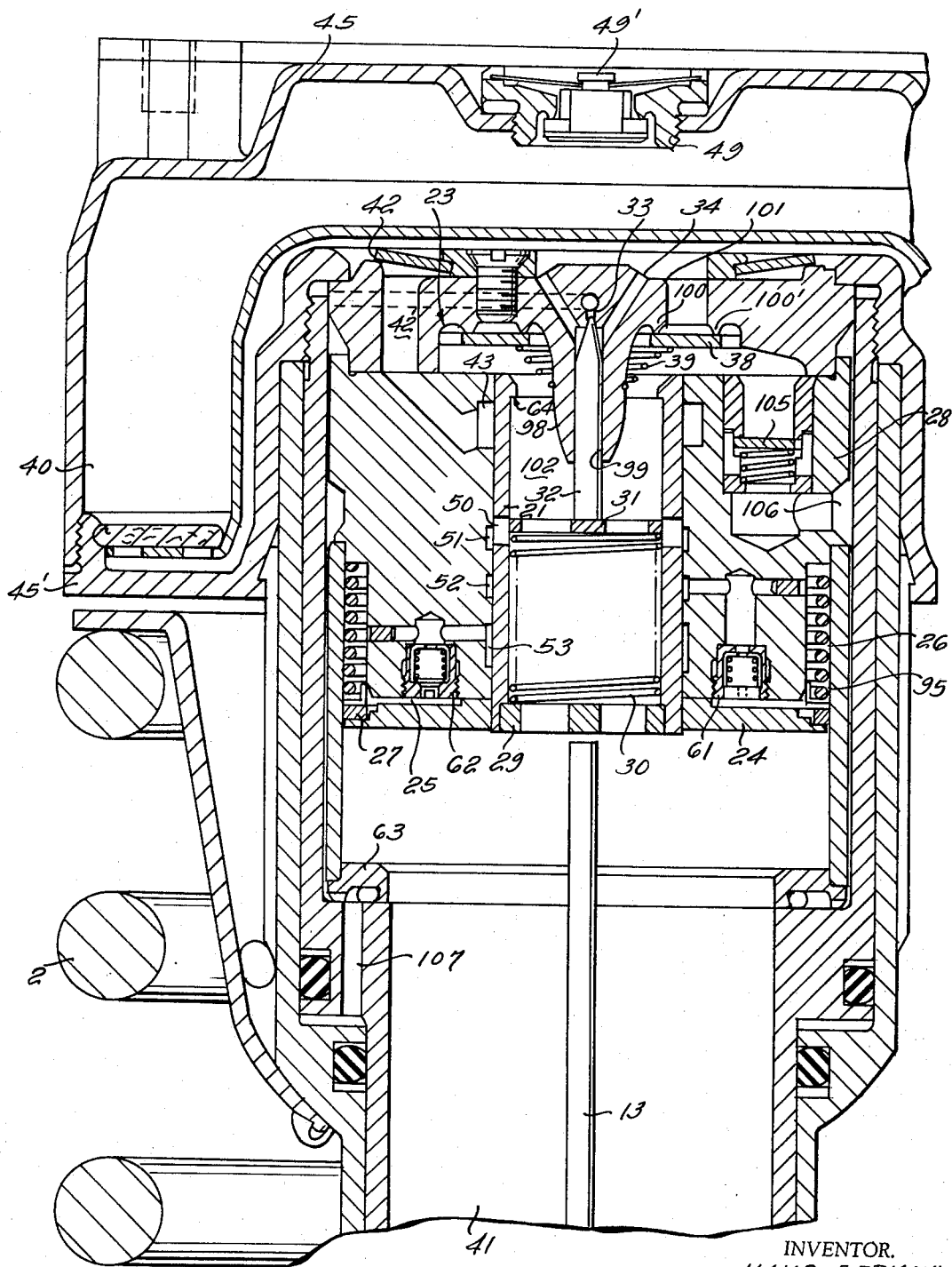
Figure 3:
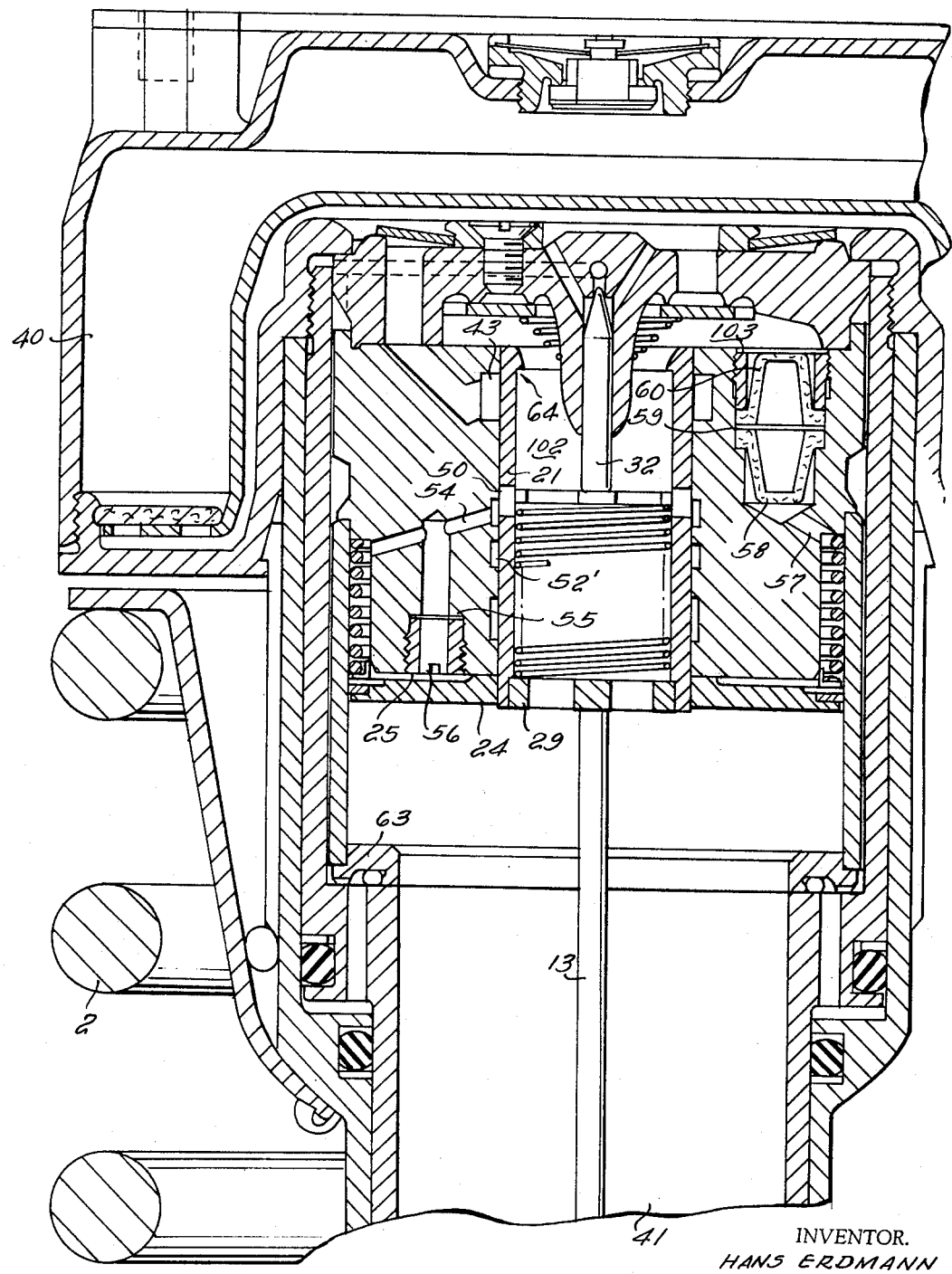

The above and other objects, features and advantages of the present invention will become more readily apparent from the following description, reference being made to the accompanying drawing in which:

FIG. 1 is an axial cross-sectional view through a shock absorber, in accordance with this invention; and FIGS. 2 and 3 are enlarged axial cross-sectional detail views of the level-maintaining device along different section planes.

An hydraulic shock absorber and level-maintaining suspension system, in accordance with the present invention, comprises three major components, namely, the hydraulic shock damper, a suspension spring and a regulator having a fluid reservoir, pump means and fluid-responsive means (e.g. a vehicle-body lifting cylinder) interposed between the suspension spring and one of the parts of the vehicle for re-establishing the desired level of the vehicle body. In FIGS. 1–3, I show a hydraulic shock damper which comprises a pivoting eye or lug 1 mountable upon the vehicle axle or axle assembly and having an upwardly open frustoconical seat-forming portion 80 whose outer flange 81 serves as a stop for the suspension spring 2. An inner axially extending flange 83 centers the spring 2 upon the lower support member 1 of the shock damper. Spring 2 is of the coil-compression type commonly used in vehicle suspensions to urge apart the vehicle body and axle assemblies, alone or in conjunction with leaf-spring suspension systems, torsion bars or the like. As is conventional, the coil spring 2 surrounds the shock-absorber mechanism which, in the improved present construction, comprises a protective cylindrical sleeve 3 which is fastened at 84 to the frustoconical member 80 and extends coaxially along but is spaced outwardly of the piston rod 4 which is threaded at 85 into the lug 1. At the free or upper end of the piston rod 4, I provide a damping piston 5 which is locked against the shoulder 86 by a nut 6 threaded into the free upper end of the piston rod 4. The piston 5 is provided with bores 87 or other fluid passages in the usual manner, these passages co-operating with membranes 7 and 8 to throttle the hydraulic fluid stream as it passes from one side of the piston 5 to the other upon contraction and extension of the shock absorber in the manner of a dashpot. The chambers 44 and 88 on opposite sides of the piston 5 contain the liquid medium which fills the reservoir to the level designated at A.

The shock damper at the level-maintaining suspension device further comprises an inner cylindrical sleeve 15, constituting a damper tube, whose lower extremity is closed by a screw cap 9 into a channel 89 in which is fitted an abutment cushion 10 of an elastomeric (i.e. resiliently compressible) material resistant to attack by the oil or other hydraulic fluid within the assembly. The cap 9 is formed with an axially extending boss 90 in which is seated a shaft-type seal 11 through which piston rod 4 slidably but sealingly passes. The seal 11 retains fluid within the chamber 88 at least to an extent sufficient to constitute such fluid as an oscillation-damping medium upon reciprocation of the piston 5. The frustoconical member 80 is provided with a vent 91 to permit air to escape from and enter the interior of the sleeve 3 as the cap 9 and the lower end of the sleeve 15 telescopes into or is withdrawn from the interior of sleeve 3. In the tubular piston rod 4, I provide a pre-tensioned coil spring 12 of spiral configuration whose upper end is rigid with a bushing 14 threaded into the piston 5. The lower end of spring 12 engages the lower extremity of a control rod 13 which extends coaxially through the piston 5 and the cylindrical sleeve 15 into the level-maintaining or regulating mechanism. Thus, the control rod 13 is resiliently suspended in the piston rod 4 and urged upwardly under the pre-tension of the spring 12.

At its upper extremity, the damper tube 15 is widened outwardly and defines with a stepped cylinder 17 (snugly surrounding the member 15) an operating chamber 16 sealed from the exterior by O-rings 18 and 19. The upper extremity of the coil spring 12 is seated against a plate 20 whose neck 92 is affixed to and entrained with the outer or cylinder member 17 while its outwardly extending flange 93 serves as a rest for the spring 2. It will thus be evident that a relative axial displacement of members 15 and 17 will serve to prestress the spring as the member 17 moves relatively downwardly (FIG. 1).

The level-maintaining regulator comprises a control slide 21 which is received in the head 94 of tube 15 and coaxially surrounds the rod 13. A regulator housing 22, in turn, slidably surrounds and engages the control slide 21 and is provided with a check-valve assembly 23. A sliding piston 24 is rigidly connected with the control slide 21 and defines within the control housing 22 a damper chamber 25 receiving a coil spring 26. A sealing ring 27 is interposed between the piston 24 and the sleeve 28 to block comunication between the annular compartment 95 for the spring 26 and the chamber 41.

The perforated disk 29 (FIGS. 1 and 2) forms a stop for a spring 30 which also bears against an axially shiftable plate 31 adapted to act upon a needle-valve member 32. The latter is axially shiftable in a boss 98 whose bore 99 is substantially coaxial with the needle-valve member 32 and the rod 13. The conical end or point of the needle-valve member 32 is adapted to seat in a passage 33 thereby blocking communication between the latter and a duct 34 leading from the bore 99 to a passage 35 in channel 36 and a bore 37 to regulate the outflow of the damping liquid from the working chamber 16. The foot-type check valve 23 includes a spring 39 which urges an intake-valve plate 38 against its seat 100, 100' to close communication via passage 101 between the reservoir 40 and the shock-damper chamber 41. Upon the development of a reduced pressure in chamber 41, as a consequence of reciprocation of the piston 5 and its shock-damping action, fluid can be drawn from the reservoir 40 through the passage 101 past the valve plate 38 and into the needle-valve compartment 102; from this compartment the fluid passes through the apertured plates 29 and 31 and through the coil spring 30 into chamber 41.

As is usually the case with shock-damping valves, the damper chamber 41 is also connected with the reservoir 40 by a preloaded valve 42 through which hydraulic fluid can flow out of the shock-damping chamber 41 via an annular groove 43 in dependence upon the position of the slide-valve sleeve 21 which is shiftable between an "open" position in which the passage 42' communicates with compartment 102 and a "closed" position in which communication with compartment 102 is blocked. The reservoir 40 is affixed to the vehicle body or chassis by means of the reservoir cap 45 via metal-rubber shock mounts 46, the cap 45 being threaded onto a flank 45' of the cylinder head to close the reservoir. A plug 49, provided with a venting valve 49' in the usual manner, is removably mounted in the cap 45 for replenishing the hydraulic fluid within the reservoir. Moreover, an annular filter 47 overlies an intake cap 48 within this reservoir so that the filter and cap 48 form a check valve through which the liquid is drawn. The venting valve 49' presents the detrimental development of a reduced pressure in reservoir 40.

Referring now especially to FIGS. 2 and 3, in which the head of the suspension device of FIG. 1 is shown in greater detail, it will be seen that the vehicle-body level (i.e. height of the body or chassis above the ground or relative to the axle) is established by the flow of fluid in accordance with the position of the slide 21. Thus fluid can flow from the damper chamber 41 through the openings in the perforated disk 29 and into the slide-valve chamber 102 and thence into one of the three passages 51, 52 or 53 in accordance with the position of the slide. In the position of the slide 21, illustrated in FIGS. 2 and 3, communication between the compartment 102 and the upper passage 51 is provided through a valve opening 50; from passage 51, the liquid flows via a bore 54 and a throttle disk 55 into the damper chamber 25. The throttle disk 55 is interchangeable and is held in place by a tubular screw 56 (FIG. 3). Simultaneously, the damper chamber 25 communicates with the shock-damper chamber via a throttle disk 59 (held in place by a tubular screw 103 and a pair of filter plugs 58, 60). The throttle disk 59 has a substantially smaller aperture than the throttle disk 55 and thus constricts the flow of fluid there passed to a much greater extent but is not controlled. Both throttle disks are thus connected in parallel while the throttle disk 59 is disposed at the highest point of the damper chamber 25 to permit effective bleeding or venting of air from this chamber.

When the vehicle body attains the desired level, the control rod 13 moves downwardly away from the apertured disk 29 and the control sleeve 21 is shifted by the spring 26 downwardly via the piston-like disk 24. When the upper edge of the control slide 21 opens the annular groove 43, the passage 51 is blocked and port 50 communicates with a passage 52 which, in turn, opens into the damper chamber 25 (FIG. 2) by way of the check valve 61. Thus the damper chamber 25 is filled without difficulty. The upper edge of the control slide 21 extends to the lower edge of the annular groove 43 while the opening 50 communicates with the passage 53 whereby the chamber 25 is filled with liquid via the diametrically opposed check valve 62. Thus, the further downward movement of the slide 21 is strongly braked or limited. The damper chamber 25 can then be filled only via the relatively constricted throttle disk 59; thus the control slide 21 can be lowered further practically only in the stationary state of the vehicle. Inasmuch as the regulator rod 13 follows the movement of the vehicle, a single thrust thereof against the slowly sinking slide 21 immediately restores it to its rest position.

When the vehicle is unloaded at the conclusion of its travels, the suspension spring 2 is decompressed and the stem 13 is disengaged from the rising perforated disk 29. Since no impulse is then delivered by the stem 13, the slide valve 21 under the action of spring 26 slowly settles and the damper chamber 25 receives fluid via the throttle disk 59. Shortly before, the disk 24 forming the floor of the chamber 25 engages the stop provided by the abutment ring 63 below the chamber 25, an abutment 64 entrains the disk 31 together with the slide 21 and permits the needle valve 32 to open. A return flow is thus permitted from the working chamber 16 into the reservoir 40 and the vehicle body is thus permitted to settle to the desired level whereupon the stem 13 engages the disk 29 and brings the disk 31 into valve-closing arrangement with the needle 32. When the vehicle is set in motion, the stem 13 drives the disk 29 and the control slide 21 entrained therewith upwardly sufficiently upon the annular passage 53. This upward movement of the slide 21 is facilitated by the passage of fluid from the chamber 25 via the check valve 62, passage 53 and the control opening 50 into the damper chamber 41 via passage 43 when the upper edge of slide 21 unblocks the passage 43.

Upon loading of the stationary vehicle, the chassis is urged toward the axles of the vehicle to compress the conventional suspension springs and the compression spring 2 of the shock damper. In this condition, the stem 13 engages the disk 29 and urges the control slide 21 upwardly. Hydraulic fluid cannot pass the valve plate 38 although it is forced via chamber 102 and the check valve 105 through a passage 106 surrounding the head 28 and thence flows via a bore 107 into the chamber 16. Because the differential piston action within this chamber 16, the members 17 and 94 are urged axially apart to stress the spring 2 and thereby restore the desired level of the vehicle body. This procedure continues during operation of the vehicle until the plate 29 withdraws from the stem 13, whereupon the sinking action of the control slide 21 commences with the results described above and the body is set at a level determined by the position of the stem.

In summary, therefore, it will be seen that during normal motion of the vehicle, the dashpot piston 5 displaces fluid in the chamber 41, on its upper stroke, through the compartment 102 and the check valve 105 to the fluid-responsive body-lifting chamber 26 which raises the vehicle body with respect to the seat 93 of the compression spring 92. This pumping action rapidly adjusts the vehicle level such that the plate 29 will come to rest upon the stem 13 in its mean position. Since the spring 12 is stronger than spring 30, the transient load variations will be accommodated by the piston 24 which acts as a controlled oscillation damper or dashpot with influx and efflux of the liquid regulated by the valve 21.

When the vehicle is loaded excessively, stem 13 bears against the plate 29 and the slide valve 21 is in its upper position, as illustrated, so that the commencement of the vehicle motion rapidly pumps fluid into the chamber 16. When, however, the vehicle is unloaded, any suction developed within chamber 41 induces an instantaneous flow of liquid from beneath the cap 48 through the passage 101 past the valve 38. With the stem 13 withdrawn from the plate 29, the downward movement of the piston 24 via the throttle action described above results in a bleeding of fluid to the reservoir from the chamber 16 and admits fluid to the chamber 25 to permit the dashpot action of piston 24. The level of the vehicle is thus reestablished at the position defined by the upper end of stem 13 which closes the valve 32 via the spring arrangement 29, 30, 31.

The invention described and illustrated is believed to admit of many modifications within the ability of persons skilled in the art, all such modifications being considered within the spirit and scope of the appended claims.

I claim:

1. A level-maintaining vehicle suspension connectable between a body member and an axle member of the vehicle, comprising:
   a shock-damping cylinder connected with one of said members;
   a damper piston reciprocable in said cylinder and connectable with the other of said members for displacing fluid within said cylinder to damp shock transmission between said members;
   suspension-spring means urging said members apart and surrounding said cylinder;
   a liquid reservoir connectable with said cylinder;
   fluid-responsive means interposed between said suspension-spring means and one of said members for receiving liquid from said reservoir upon reciprocation of said piston in said cylinder to restore a predetermined level of said body member during movement of the vehicle;
   valve means for controlling liquid communication with said fluid-responsive means;
   a level-control element comprising a rod disposed within said cylinder and extending in the direction of reciprocation of said piston; and
   fluid-control damping means interposed between said element and said valve means,
   said fluid-control damping means including a control slide having a damper chamber expandable and contractable upon movement of said chamber, resilient means urging said control slide in the direction of said rod and normally tending to hold said control slide thereagainst, and means defining with said control slide a plurality of valved passages selectively operable by said control slide in a plurality of positions thereof for controlling the flow of fluid to and from said chamber to vary the rate of movement of said control slide under the action of said resilient means in dependence upon the position of said control slide.

2. A suspension as defined in claim 1, further comprising throttle means in at least one of said passages for restricting the rate of flow of fluid from said chamber.

3. A suspension as defined in claim 1 wherein said piston is connected to said axle member and said cylinder is connected to said body member via said fluid-responsive means, said fluid-control damping means being disposed at an upper end of said cylinder with said control slide in axial alignment with said rod and said piston, said valve including a valve member in axial alignment with said control slide.

4. A suspension as defined in claim 3, further comprising a compression spring seated against said control slide and aligned with said valve member for operating said valve means upon engagement of said control slide by said rod.

5. A suspension as defined in claim 4 wherein said cylinder is enlarged at an upper portion for receiving said fluid-control damping means and said valve means.

6. A suspension as defined in claim 4, further comprising a coil spring resiliently supporting said rod upon said piston.

7. A suspension as defined in claim 4, further comprising a filter forming a check valve interposed between said cylinder and said reservoir.

8. A suspension as defined in claim 4 wherein said reservoir surrounds said fluid-control damping means.

9. A suspension as defined in claim 4 wherein:

said control slide is a tubular member and is provided with a perforated plate at its lower extremity engageable by said rod;

said compression spring is seated in said slide against said plate;

said fluid-control damping means includes an apertured disk resting upon said compression spring and engageable with said valve member;

said cylinder has a head at its upper extremity;

said fluid responsive means includes a sleeve surrounding said head and axially shiftable relatively thereto to define with said head a liquid compartment of variable volume;

said valve means includes a needle-valve arranged interposed between said reservoir and said compartment for controlling the flow of liquid from said compartment to said reservoir;

said sleeve forms a seat for a corresponding extremity of said suspension-spring means;

said fluid-control damping means further comprises an annular body received in said head and formed with said passages;

said control slide is received slidably in said body;

said body is provided with unidirectional valve means communicating between said cylinder and said compartment for admitting liquid from said cylinder to said compartment upon reciprocation of said piston;

said fluid-control damping means includes at least one passage selectively blockable by said control slide for permitting the discharge of liquid from said cylinder into said reservoir; and said suspension further comprises a check valve interposed between said reservoir and said cylinder for admitting liquid from said reservoir into said cylinder.

References Cited

UNITED STATES PATENTS

| | | |
|---|---|---|
| 3,074,708 | 1/1963 | Lush et al. |
| 3,179,401 | 4/1965 | Bartram et al. |

FOREIGN PATENTS

| | | |
|---|---|---|
| 536,263 | 5/1941 | Great Britain. |
| 378,697 | 7/1964 | Switzerland. |

MILTON BUCHLER, *Primary Examiner.*

G. E. A. HALVOSA, *Assistant Examiner.*